(12) United States Patent
Araki et al.

(10) Patent No.: US 12,158,365 B2
(45) Date of Patent: Dec. 3, 2024

(54) PHYSICAL QUANTITY DETECTION DEVICE

(71) Applicant: Hitachi Astemo, Ltd., Hitachinaka (JP)

(72) Inventors: Yushi Araki, Hitachinaka (JP); Akira Uenodan, Hitachinaka (JP); Nobuaki Gorai, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 0 days.

(21) Appl. No.: 18/266,399

(22) PCT Filed: Sep. 7, 2021

(86) PCT No.: PCT/JP2021/032799
§ 371 (c)(1),
(2) Date: Jun. 9, 2023

(87) PCT Pub. No.: WO2022/162994
PCT Pub. Date: Aug. 4, 2022

(65) Prior Publication Data
US 2024/0027245 A1 Jan. 25, 2024

(30) Foreign Application Priority Data
Jan. 27, 2021 (JP) .................. 2021-011433

(51) Int. Cl.
*G01F 1/00* (2022.01)
*F02D 41/18* (2006.01)
*G01F 1/684* (2006.01)

(52) U.S. Cl.
CPC .......... *G01F 1/6842* (2013.01); *F02D 41/18* (2013.01)

(58) Field of Classification Search
CPC .......... G01F 1/6842; G01F 5/00; F02D 41/18; Y02T 10/12
See application file for complete search history.

(56) References Cited

U.S. PATENT DOCUMENTS

| | | | |
|---|---|---|---|
| 10,663,334 B2 * | 5/2020 | Briese | ........................ G01F 5/00 |
| 2017/0261359 A1 * | 9/2017 | Briese | .................... G01F 1/6842 |
| 2018/0188087 A1 * | 7/2018 | Briese | ........................ G01F 5/00 |
| 2023/0408316 A1 * | 12/2023 | Gorai | .................... G01F 1/6842 |

FOREIGN PATENT DOCUMENTS

| | | |
|---|---|---|
| JP | 2001-255188 A | 9/2001 |
| JP | 2017-528718 A | 9/2017 |

* cited by examiner

*Primary Examiner* — Phutthiwat Wongwian
*Assistant Examiner* — Sherman D Manley
(74) *Attorney, Agent, or Firm* — Volpe Koenig

(57) ABSTRACT

A physical quantity detection device for reducing an influence of a sound wave generated in a turbocharger and suppressing a decrease in detection accuracy of a physical quantity including a flow rate of gas. The device detects a physical quantity of air from an intake passage of an engine equipped with a turbocharger. The physical device includes a sub-passage that takes in part of air flowing from an upstream to a downstream side of the intake passage along a first direction, and a flow rate detection unit that detects a flow rate of the air taken in the sub-passage. The sub-passage includes an inlet that opens toward the upstream side in the first direction, an outlet that opens toward the downstream side in the first direction, and an attenuation chamber that attenuates a sound wave propagating from the turbocharger to an inside of the outlet.

8 Claims, 10 Drawing Sheets

PHYSICAL QUANTITY DETECTION DEVICE

TECHNICAL FIELD

The present disclosure relates to a physical quantity detection device.

BACKGROUND ART

Conventionally, an invention related to a device for measuring a flow rate and a flow velocity is known (PTL 1 below). The conventional measuring device includes a flow dividing path, a detection element, and a retention space. The flow to be measured is introduced into the flow dividing path. The detection element is exposed to the flow in the flow dividing path and detects various amounts related to the flow such as a flow velocity and a flow rate. The retention space is provided in the middle of the flow dividing path and between the detection element and an outlet of the flow dividing path, and retains at least a part of a reverse flow reversely introduced from the outlet. This measuring device is characterized in that, in the vicinity of the outlet, the flow dividing path is inclined toward a downstream side when the flow to be measured flows in a forward direction toward the outlet (PTL 1, paragraph 0006, claim 1, FIG. 1, and the like).

According to the conventional measuring device, since the retention space is provided in the middle of the flow dividing path, the influence of the reverse flow on the measurement accuracy is reduced, and the influence of the pulsation is also reduced (PTL 1, paragraph 0007, and the like).

CITATION LIST

Patent Literature

PTL 1: JP 2001-255188 A

SUMMARY OF INVENTION

Technical Problem

With the demand for downsizing of vehicles, internal combustion engine vehicles equipped with turbochargers tend to increase. However, when the space of an engine compartment is reduced due to the downsizing of the vehicle, a distance between a physical quantity detection device that detects a physical quantity such as a flow rate of an intake air of the engine and a turbocharger is shortened, and a sound wave generated by the turbocharger easily reaches the physical quantity detection device. In such a case, in the conventional measuring device, the influence of the sound wave generated in the turbocharger may reach the detection element, and the detection accuracy of the flow rate and the flow velocity may decrease.

The present disclosure provides a physical quantity detection device capable of reducing an influence of a sound wave generated in a turbocharger and suppressing a decrease in detection accuracy of a physical quantity including a flow rate of gas.

Solution to Problem

One aspect of the present disclosure is a physical quantity detection device that detects a physical quantity of air taken in from an intake passage of an engine equipped with a turbocharger, the physical quantity detection device including: a sub-passage that takes in a part of air flowing from an upstream side to a downstream side of the intake passage along a first direction parallel to a center line of the intake passage; and a flow rate detection unit that detects a flow rate of the air taken in the sub-passage, in which the sub-passage includes an inlet that opens toward the upstream side in the first direction, an outlet that opens toward the downstream side in the first direction, and an attenuation chamber that attenuates a sound wave propagating from the turbocharger to an inside of the outlet.

Advantageous Effects of Invention

According to the aspect of the present disclosure, it is possible to provide a physical quantity detection device capable of reducing an influence of the sound wave generated in the turbocharger and suppressing a decrease in detection accuracy of a physical quantity including a flow rate of gas.

DESCRIPTION OF EMBODIMENTS

Hereinafter, an embodiment of a physical quantity detection device according to the present disclosure will be described with reference to the drawings.

Figure 1:
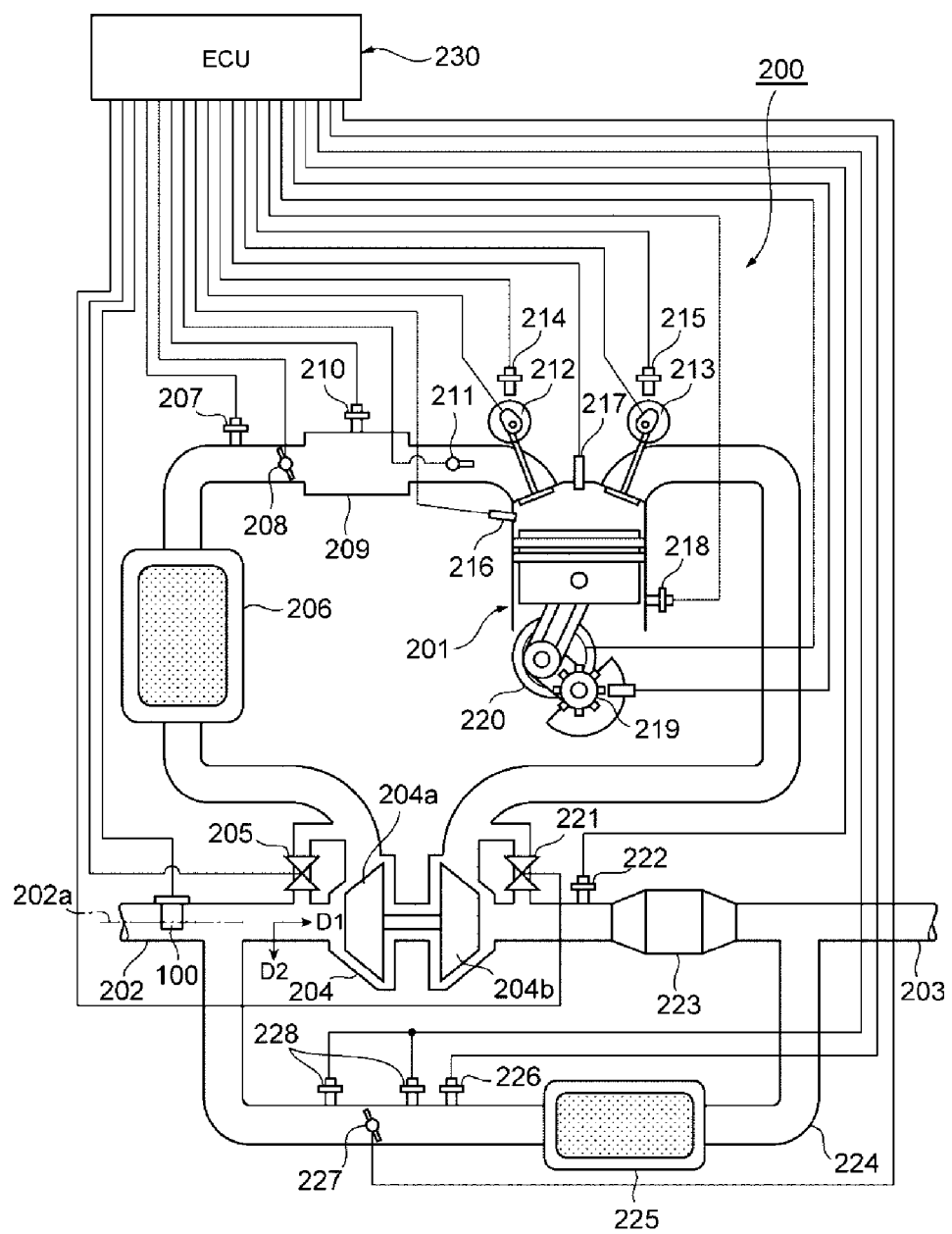
FIG. 1 is a schematic diagram of an engine system illustrating an embodiment of a physical quantity detection device according to the present disclosure.

FIG. 1 is a schematic diagram of an engine system 200 illustrating an embodiment of a physical quantity detection device according to the present disclosure. The engine system 200 is mounted on a vehicle such as an automobile, for example, and generates power for traveling the vehicle. The engine system 200 includes, for example, an engine 201 that is an internal combustion engine, and an intake passage 202 and an exhaust passage 203 connected to the engine 201.

The intake passage 202 is provided with, for example, a physical quantity detection device 100, a turbocharger 204, an air bypass valve 205, an intercooler 206, a supercharging temperature sensor 207, a throttle valve 208, an intake manifold 209, a supercharging pressure sensor 210, and a flow enhancing valve 211.

The engine 201 includes, for example, an intake valve 212, an exhaust valve 213, open/close position sensors 214 and 215, a fuel injection valve 216, an ignition plug 217, a knock sensor 218, a crank angle sensor 219, and a variable compression ratio mechanism 220.

The exhaust passage 203 is provided with, for example, a wastegate valve 221, an air-fuel ratio sensor 222, an exhaust purification catalyst 223, an exhaust gas recirculation (EGR) pipe 224, an EGR cooler 225, an EGR temperature sensor 226, an EGR valve 227, and differential pressure sensors 228.

The engine system 200 further includes, for example, a control device 230. The control device 230 is constituted by, for example, an electronic control unit (ECU) that controls the engine 201, or constitutes a part of the ECU. The ECU is, for example, a microcontroller, and includes a central processing unit (CPU) (not illustrated), a storage device such as a ROM and a flash memory, various computer programs and data stored in the storage device, a timer, and an input/output unit that communicates with peripheral devices.

The physical quantity detection device 100 includes, for example, a temperature sensor, a flow rate sensor, and a humidity sensor, measures a temperature, a flow rate, and a humidity of air taken into the exhaust passage 203, and outputs measurement result to the control device 230. The turbocharger 204 includes a compressor 204a and a turbine 204b. The gas flowing through the exhaust passage 203 rotates the turbine 204b, and the rotation of the turbine 204b rotates the compressor 204a. As a result, the turbocharger 204 pressure-feeds the air taken into the intake passage 202 to the engine 201.

The air bypass valve 205 is provided, for example, in a bypass passage bypassing the turbocharger 204 of the intake passage 202, and is opened and closed by a control signal from the control device 230 to prevent a pressure of the air between the compressor 204a and the throttle valve 208 from excessively increasing. For example, in a case where the throttle valve 208 is rapidly closed in a supercharged state, the air bypass valve 205 is opened according to the control of the control device 230. As a result, the compressed air downstream of the compressor 204a flows back to an upstream of the compressor 204a through the bypass passage, and the supercharging pressure decreases.

The intercooler 206 cools the intake air whose temperature has been increased by adiabatic compression by the compressor 204a to lower the temperature. The supercharging temperature sensor 207 measures a temperature (supercharging temperature) of the intake air cooled by the intercooler 206, and outputs a measurement result to the control device 230. The throttle valve 208 is provided, for example, downstream of the supercharging temperature sensor 207, and controls an amount of intake air flowing into a cylinder of the engine 201 by controlling an opening degree by the control of the control device 230. The throttle valve 208 includes, for example, a butterfly valve capable of controlling a valve opening degree by a control signal from the control device 230 independently of a depression amount of an accelerator pedal by a driver of the vehicle.

The intake manifold 209 is provided downstream of the throttle valve 208, and the supercharging pressure sensor 210 is assembled thereto. The supercharging pressure sensor 210 measures a pressure of the intake air in the intake manifold 209, that is, a supercharging pressure, and outputs a measurement result to the control device 230. Note that the intake manifold 209 and the intercooler 206 may be integrated. In this case, a volume of the intake passage 202 from the compressor 204a to the cylinder of the engine 201 can be reduced, and the responsiveness of acceleration/deceleration of the vehicle can be improved.

The flow enhancing valve 211 is provided downstream of the intake manifold 209, generates a drift in the intake air, and enhances turbulence generated in the flow of the air-fuel mixture in the cylinder of the engine 201. Each of the intake valve 212 and the exhaust valve 213 is controlled by the control device 230 and includes a variable valve mechanism for continuously changing a phase of a valve opening/closing position. Each of the open/close position sensors 214 and 215 is provided in each of the variable valve mechanisms of the intake valve 212 and the exhaust valve 213, detects phases of open/close positions of the intake valve 212 and the exhaust valve 213, and outputs the phases to the control device 230.

The fuel injection valve 216 is, for example, a direct injection type that is provided in the cylinder of the engine 201 and directly injects fuel into the cylinder. Note that the fuel injection valve 216 may be a port injection type that injects fuel into an intake port. The ignition plug 217 is provided in the cylinder of the engine 201, and ignites the combustible air-fuel mixture in the cylinder by a spark of an electrode portion exposed in a head of the cylinder. The knock sensor 218 is provided in a cylinder block of the engine 201, and detects the presence or absence of knock generated in a combustion chamber.

The crank angle sensor 219 is assembled to a crankshaft of the engine 201, and outputs a signal corresponding to a rotation angle of the crankshaft as a signal indicating a rotation speed of the crankshaft to the control device 230 in each combustion cycle. The variable compression ratio mechanism 220 is provided in a crank mechanism of the engine 201, and can improve the maximum output while maintaining the thermal efficiency in an optimum state by changing a compression ratio by the control of the control device 230 according to an operating state of the engine 201.

The wastegate valve 221 is, for example, an electric valve that is provided in a bypass passage bypassing the turbocharger 204 of the exhaust passage 203 and whose opening degree is controlled by a control signal from the control device 230. For example, the control device 230 adjusts the opening degree of the wastegate valve 221 based on the supercharging pressure measured by the supercharging pressure sensor 210, so that a part of an exhaust gas passes through the bypass passage of the exhaust passage, and the work given to the turbine 204b of the turbocharger 204 by the exhaust gas can be reduced. As a result, the supercharging pressure can be held at a target pressure.

The air-fuel ratio sensor 222 is provided, for example, downstream of the wastegate valve 221 of the exhaust passage 203, measures the oxygen concentration of the exhaust gas, that is, an air-fuel ratio, and outputs a measurement result to the control device 230. The exhaust purification catalyst 223 is provided, for example, downstream of the air-fuel ratio sensor 222 of the exhaust passage 203, and purifies harmful exhaust gas components such as carbon monoxide, nitrogen compounds, and unburned hydrocarbon in the exhaust gas by a catalytic reaction.

The EGR pipe 224 connects a portion of the exhaust passage 203 on a downstream side of the exhaust purification catalyst 223 and a portion of the intake passage 202 on an upstream side of the compressor 204a of the turbocharger 204, and recirculates a part of the exhaust gas having passed through the exhaust purification catalyst 223 to the intake passage 202 on the upstream side of the compressor 204a. The EGR cooler 225 is provided in the EGR pipe 224 and cools the exhaust gas passing through the EGR pipe 224. The EGR temperature sensor 226 is provided, for example, between the EGR cooler 225 and the EGR valve 227, measures a temperature of the exhaust gas flowing through the EGR pipe 224, and outputs the measured temperature to the control device 230.

The EGR valve 227 is provided, for example, between the EGR temperature sensor 226 and the intake passage 202, and its opening degree is controlled by the control device 230 to control a flow rate of the exhaust gas recirculated from the exhaust passage 203 to the intake passage 202. The differential pressure sensors 228 are provided in the EGR pipe 224, are installed on the upstream side and the downstream side of the EGR valve 227, measure a differential pressure between a pressure of the exhaust gas on the upstream side of the EGR valve 227 and a pressure of the exhaust gas on the downstream side of the EGR valve 227, and outputs the differential pressure to the control device 230.

For example, as described above, the control device 230 is connected to various sensors constituting the engine system 200 and an actuator that drives each unit of the engine system 200. The control device 230 controls operations of actuators such as the throttle valve 208, the intake valve 212 and the exhaust valve 213 including the variable valve mechanism, the fuel injection valve 216, and the EGR valve 227, for example. Furthermore, the control device 230 detects an operating state of the engine 201 based on signals input from various sensors, and ignites the ignition plug 217 at a timing determined according to the operating state.

The physical quantity detection device 100 is used in a state of being inserted into the intake passage 202 from a mounting hole provided in a passage wall of the intake passage 202 and fixed to the passage wall of the intake passage 202, for example. The physical quantity detection device 100 takes in a part of air taken in through an air cleaner (not illustrated) and flowing from the upstream side to the downstream side of the intake passage 202 along a first direction D1 parallel to a center line 202a of the intake passage 202.

The physical quantity detection device 100 detects a physical quantity of the taken air, and outputs the physical quantity to the control device 230. The physical quantity detection device 100 protrudes in a radial direction of the intake passage 202 from the passage wall of the intake passage 202 toward the center line 202a of the intake passage 202. That is, a protruding direction of the physical quantity detection device 100 in the intake passage 202 is, for example, a second direction D2 orthogonal to the first direction D1 parallel to the center line 202a of the intake passage 202.

For example, the control device 230 calculates a fuel injection amount and an ignition timing based on a physical quantity of the intake air which is an output of the physical quantity detection device 100 and a rotation speed of the engine 201 measured based on an output of the crank angle sensor 219. Based on these calculation results, the control device 230 controls the fuel injection amount by the fuel injection valve 216 and the ignition timing of the ignition plug 217.

In practice, the control device 230 further finely controls a fuel supply amount and the ignition timing based on the temperature of the intake air, a change state of the opening degree of the throttle valve 208, a change state of the rotation speed of the engine 201, and a state of the air-fuel ratio of the exhaust gas. The control device 230 further controls an amount of air bypassing the throttle valve 208 by an idle air control valve (not illustrated) in an idle operating state of the engine 201, and controls the rotation speed of the engine 201 in the idle operating state.

Both the fuel supply amount and the ignition timing, which are main control variables of the engine 201, are calculated using the output of the physical quantity detection device 100 as a main parameter. Therefore, it is important to improve the measurement accuracy of the physical quantity detection device 100, suppress the temporal change, and improve the reliability in terms of improving the control accuracy of the vehicle and securing the reliability.

In particular, in recent years, demands for fuel saving of vehicles are very high, and demands for exhaust gas purification are very high. In order to meet these demands, it is extremely important to improve the detection accuracy of the physical quantity of the intake air detected by the physical quantity detection device 100. Furthermore, it is also important that the physical quantity detection device 100 maintains high reliability. Furthermore, the vehicle on which the physical quantity detection device 100 is mounted is used in an environment where changes in temperature and humidity are large. It is desirable that the physical quantity detection device 100 consider a response to a change in temperature or humidity in the use environment and a response to dust, contaminants, and the like.

Furthermore, the number of internal combustion engine vehicles equipped with the turbocharger 204 tends to increase with the demand for downsizing of vehicles. However, when the space of the engine compartment is reduced due to the downsizing of the vehicle, the distance between the physical quantity detection device 100 that detects a physical quantity such as the flow rate of the intake air of the engine 201 and the turbocharger 204 is shortened, and a sound wave generated by the turbocharger 204 easily reaches the physical quantity detection device 100.

Therefore, it is important for the physical quantity detection device 100 to reduce an influence of the sound wave generated in the turbocharger 204 to suppress a decrease in the detection accuracy of the physical quantity including the flow rate of the gas.

Although details will be described later, the physical quantity detection device 100 of the present embodiment has the following configuration, and suppresses a decrease in detection accuracy of a physical quantity including a flow rate of gas by reducing an influence of a sound wave generated in the turbocharger 204 (See FIGS. 5 and 6).

The physical quantity detection device 100 of the present embodiment detects a physical quantity of air taken in from the intake passage 202 of the engine 201 on which the turbocharger 204 is mounted. The physical quantity detection device 100 includes a sub-passage 130 that takes in a part of air flowing from the upstream side to the downstream side of the intake passage 202 along the first direction D1 parallel to the center line 202a of the intake passage 202, and a flow rate detection unit 151 that detects a flow rate of the air taken in the sub-passage 130. The sub-passage 130 includes an inlet 114 that opens toward the upstream side in the first direction D1, an outlet 116 that opens toward the downstream side in the first direction D1, and an attenuation chamber 134 that attenuates a sound wave propagating from the turbocharger 204 to an inside of the outlet 116.

Hereinafter, the physical quantity detection device 100 according to the present embodiment will be described in more detail with reference to FIGS. 2 to 10. Note that each of these drawings illustrates an orthogonal coordinate system including an X-axis parallel to a protruding direction of the physical quantity detection device 100 in the intake passage 202 illustrated in FIG. 1, a Y-axis parallel to the center line 202a of the intake passage 202, and a Z-axis parallel to a thickness direction of the physical quantity detection device 100. Furthermore, in the following description, it is assumed that the air taken into the intake passage 202 through an air cleaner flows from an upstream side to a downstream side (Y-axis positive direction) of the intake passage 202 along the first direction D1 parallel to the center line 202a (Y-axis) of the intake passage 202.

Figure 2:
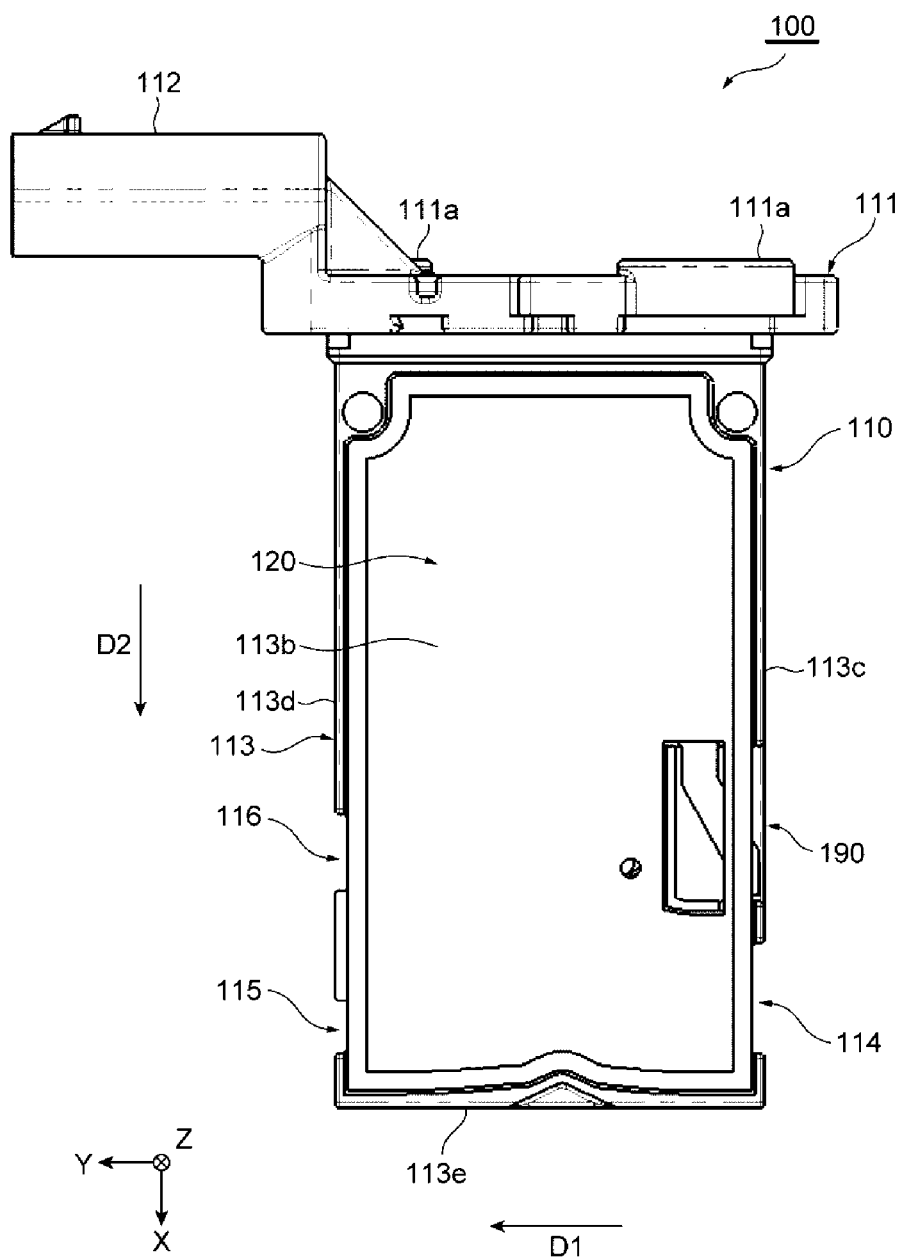
FIG. 2 is a rear view of a physical quantity detection device provided in an intake passage of the engine system of FIG. 1.
Figure 3:
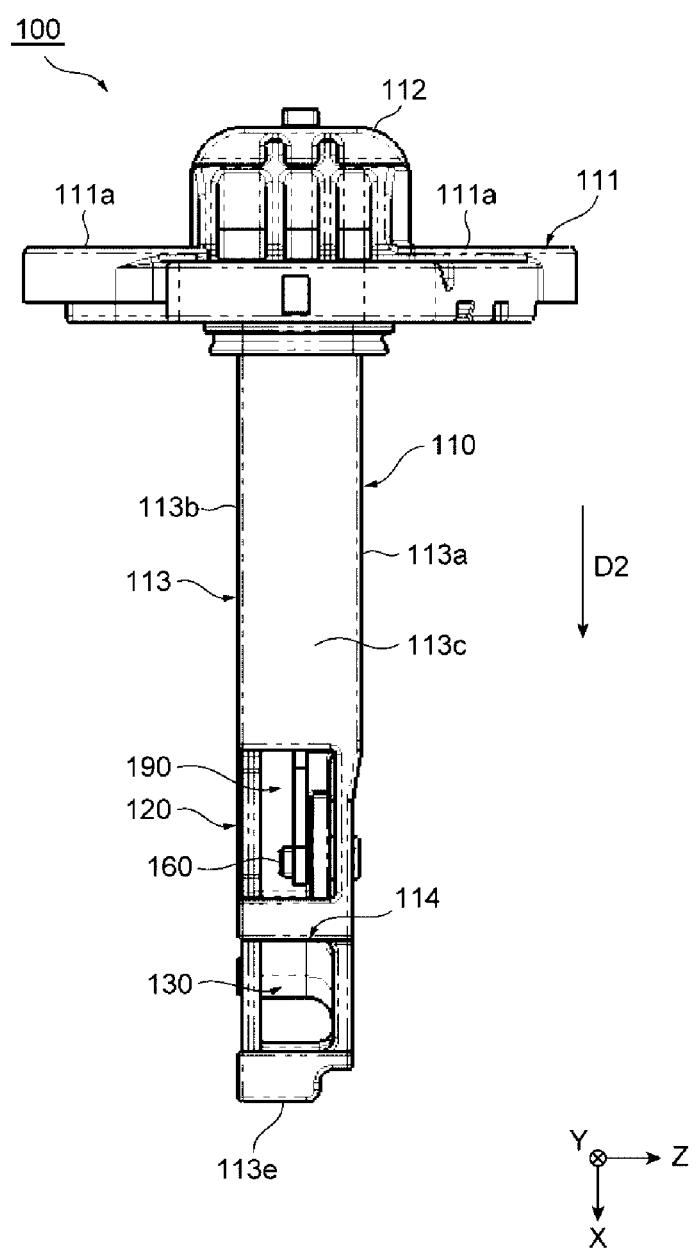
FIG. 3 is a left side view of the physical quantity detection device in FIG. 2.
Figure 4:
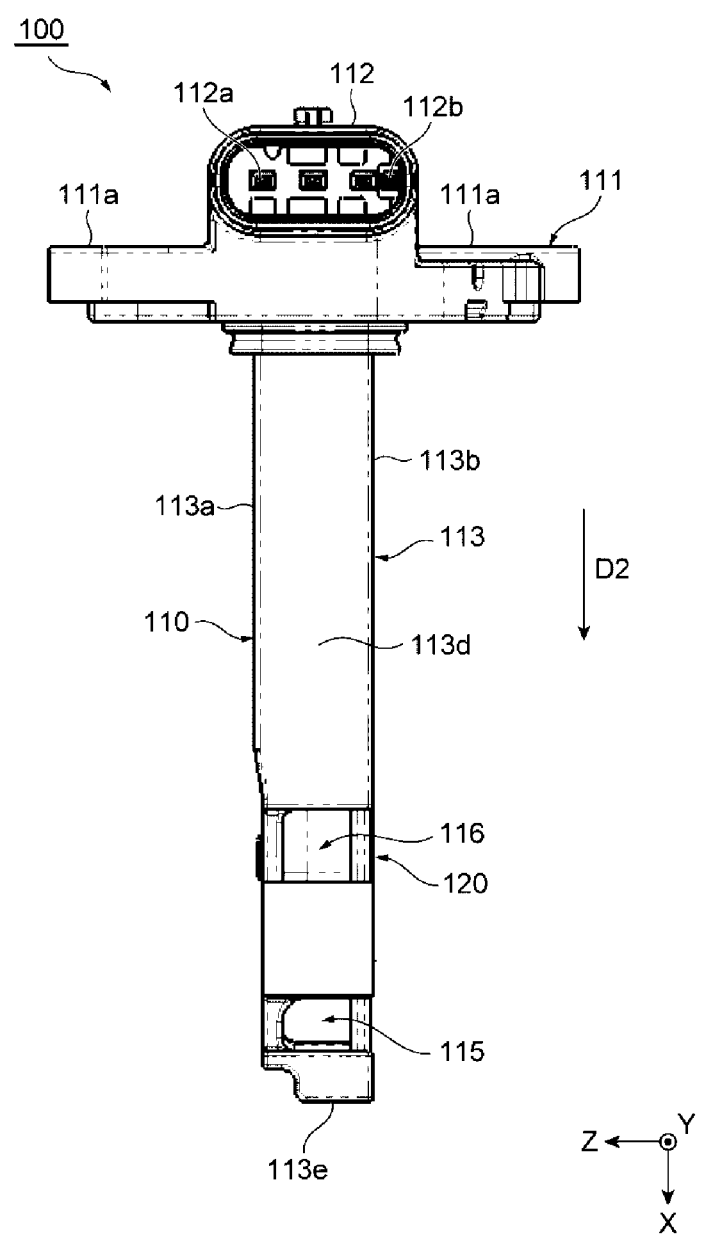
FIG. 4 is a right side view of the physical quantity detection device in FIG. 2.

FIG. 2 is a rear view of the physical quantity detection device 100 provided in the intake passage 202 of the engine system 200 in FIG. 1. FIG. 3 is a left side view of the physical quantity detection device 100 in FIG. 2. FIG. 4 is a right side view of the physical quantity detection device 100 in FIG. 2.

The physical quantity detection device 100 includes, for example, a housing 110 and a cover 120. The housing 110 is manufactured, for example, by injection molding a synthetic resin material. The cover 120 is, for example, a plate-like member made of metal or synthetic resin. As the cover 120, for example, a molded article of a synthetic resin material can be used. The housing 110 and the cover 120 constitute a housing of the physical quantity detection device 100 disposed in the intake passage 202.

The housing 110 includes, for example, a flange 111, a connector 112, and a measurement unit 113. The flange 111 has a substantially rectangular plate shape in plan view in the second direction D2, and includes a pair of fixing portions 111a at diagonal corners. Each of the fixing portions 111a has a cylindrical through hole 1/1b (see FIG. 6) that penetrates the flange 111 in a central portion and allows a fixing screw to be inserted therethrough.

The physical quantity detection device 100 is fixed to a passage wall of the intake passage 202 by, for example, the following procedure. First, the measurement unit 113 of the physical quantity detection device 100 is inserted into the intake passage 202 from a mounting hole provided in the passage wall of the intake passage 202, and the flange 111 is brought into contact with the passage wall of the intake passage 202. Next, a fixing screw inserted into the through hole 1/1b of the flange 111 of the physical quantity detection device 100 is screwed into a screw hole of the passage wall of the intake passage 202 and fastened. As a result, as illustrated in FIG. 1, the physical quantity detection device 100 is fixed to the intake passage 202.

The connector 112 protrudes from the flange 111, is disposed outside the intake passage 202, and is connected to the control device 230 via, for example, a connector and a cable (not illustrated). As illustrated in FIG. 4, a plurality of external terminals 112a and correction terminals 112b are provided inside the connector 112. Each of the external terminals 112a includes, for example, an output terminal of a physical quantity such as a flow rate, temperature, and humidity, which is a measurement result of the physical quantity detection device 100, and a power supply terminal for supplying DC power for operating the physical quantity detection device 100.

Each of the correction terminals 112b is used to measure a physical quantity after manufacturing the physical quantity detection device 100, obtain a correction value for each physical quantity detection device 100, and store the correction value in a memory inside the physical quantity detection device 100. In the subsequent measurement of the physical quantity by the physical quantity detection device 100, correction data based on the correction value stored in the memory is used, and the correction terminal 112b is not used.

The measurement unit 113 extends from the flange 111 fixed to the passage wall of the intake passage 202 toward the center line 202a of the intake passage 202 so as to protrude in the radial direction (second direction D2) of the intake passage 202 orthogonal to the center line 202a. The measurement unit 113 has a flat rectangular shape having a substantially rectangular parallelepiped shape. The measurement unit 113 has a length in the protruding direction (second direction D2) of the measurement unit 113 in the intake passage 202 and a width in a main flow direction (first direction D1) of the air in the intake passage 202. Furthermore, the measurement unit 113 has a thickness in a direction (Z-axis direction) orthogonal to the protruding direction (second direction D2, X-axis direction) and a width direction (first direction D1, Y-axis direction). As described above, since the measurement unit 113 has a flat shape along the main flow direction of the intake air flowing through the intake passage 202, the fluid resistance to the intake air can be reduced.

The measurement unit 113 has a front surface 113a, a back surface 113b, an upstream side surface 113c, a downstream side surface 113d, and a lower surface 113e. The front surface 113a and the back surface 113b are larger in area than the other surfaces of the measurement unit 113, and are substantially parallel to the protruding direction (second direction D2) of the measurement unit 113 and the center line 202a (first direction D1) of the intake passage 202. The upstream side surface 113c and the downstream side surface 113d have an elongated shape having a smaller area than the front surface 113a and the back surface 113b, and are substantially orthogonal to the center line 202a (first direction D1) of the intake passage 202. The lower surface 113e has a smaller area than the other surfaces of the measurement unit 113, is substantially parallel to the center line 202a (first direction D1) of the intake passage 202, and is substantially orthogonal to the protruding direction (second direction D2) of the measurement unit 113.

The measurement unit 113 has the inlet 114 of a sub-passage described later on the upstream side surface 113c, and has the outlet 116 of the sub-passage on the downstream side surface 113d. Furthermore, the measurement unit 113 may have a foreign substance discharge port 115 of the sub-passage on the downstream side surface 113d. The inlet 114, the outlet 116, and the foreign substance discharge port 115 of the sub-passage are provided at a distal end portion of the measurement unit 113 on a distal end side of a center in the protruding direction (second direction D2) of the measurement unit 113. As a result, the air in the vicinity of the central portion of the intake passage 202 away from an inner wall surface of the intake passage 202 can be taken in from the inlet 114. Therefore, the physical quantity detection device 100 can suppress a decrease in measurement accuracy due to an influence of heat of the engine 201.

Figure 5:
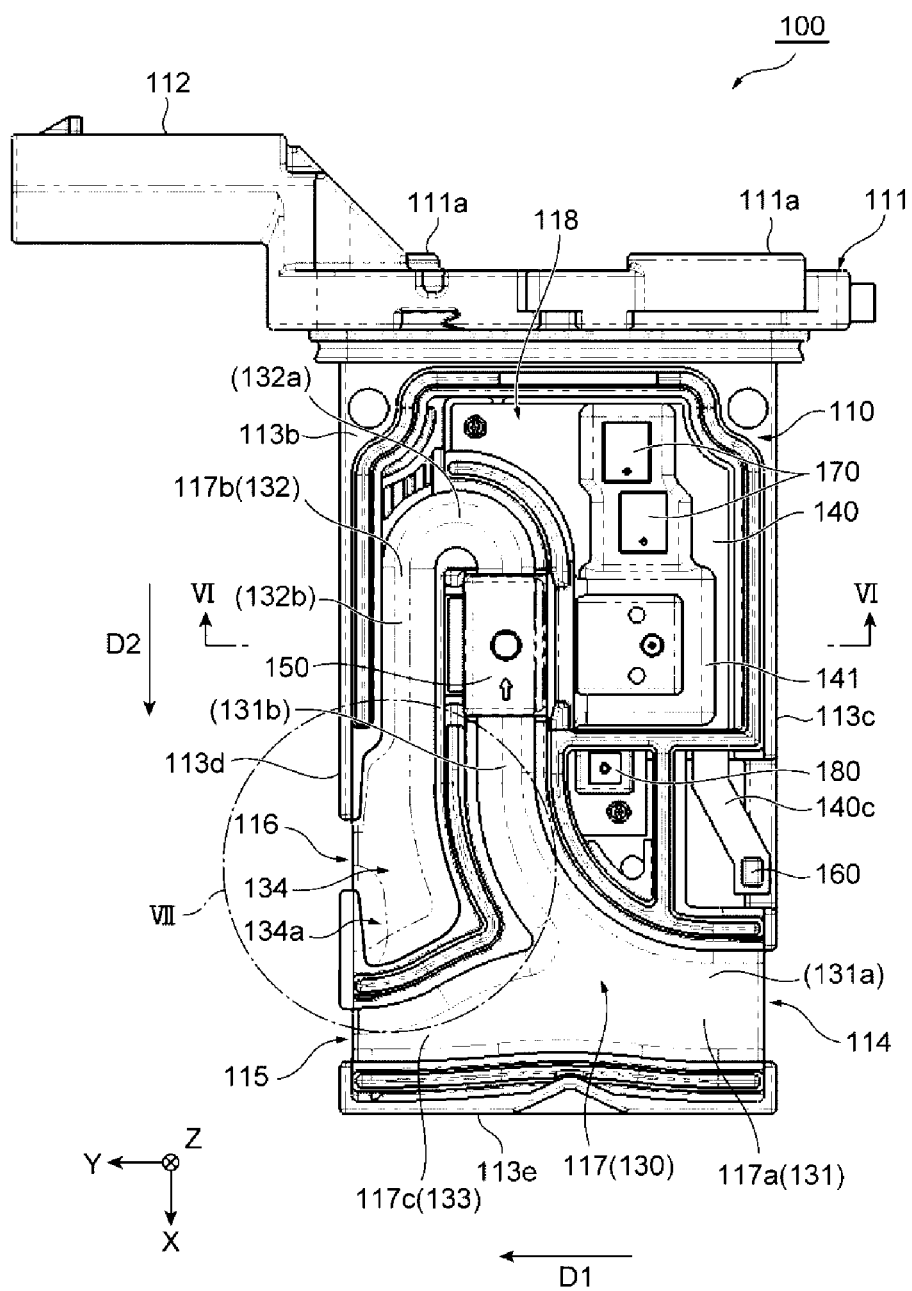
FIG. 5 is a rear view illustrating a state in which a cover of the physical quantity detection device in FIG. 2 is removed.

FIG. 5 is a rear view illustrating a state in which the cover 120 of the physical quantity detection device 100 in FIG. 2 is removed. FIG. 6 is a cross-sectional view of the physical quantity detection device 100 taken along line VI-VI in FIG. 5. The physical quantity detection device 100 of the present embodiment includes, for example, the sub-passage 130, a circuit board 140, and a chip package 150.

Figure 6:
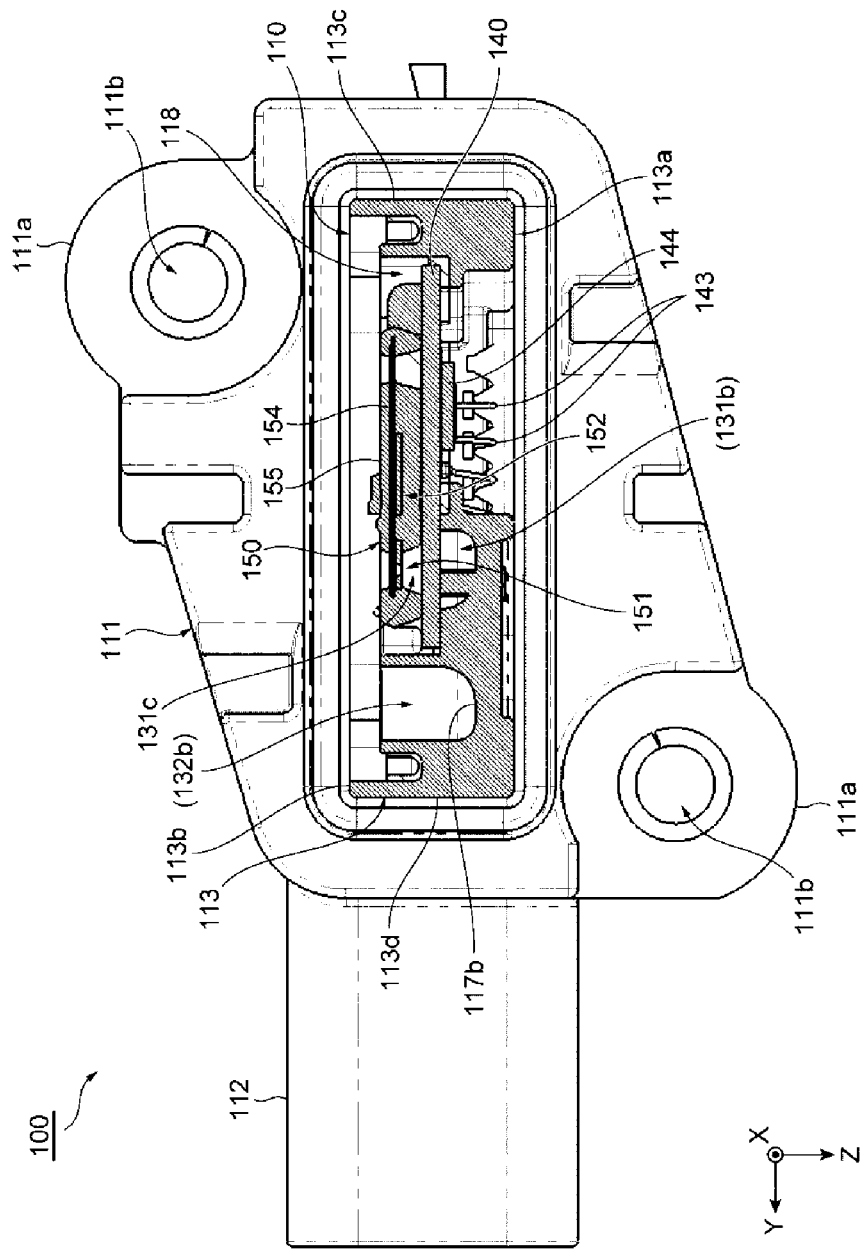
FIG. 6 is a cross-sectional view of the physical quantity detection device taken along line VI-VI in FIG. 5.

The external terminal 112a of the connector 112 illustrated in FIG. 4 is connected to a pad of the circuit board 140 via a bonding wire 143 illustrated in FIG. 6, for example. In the circuit board 140, for example, a protective circuit 144 is mounted on a surface to which the bonding wire 143 is connected. The protective circuit 144 stabilizes a voltage in the circuit and removes noise. The bonding wire 143 and the protective circuit 144 are covered and sealed with a sealing material (not illustrated). As the sealing material, for example, a silicone gel or an epoxy-based sealing material having higher rigidity than the silicone-based sealing material can be used.

As illustrated in FIG. 5, the housing 110 includes a recessed sub-passage groove 117 and a recessed circuit chamber 118 on a side of the back surface 113b of the measurement unit 113. An opening of the sub-passage groove 117 is closed by the cover 120 illustrated in FIG. 2 to form the sub-passage 130 between the sub-passage groove and the cover 120.

The sub-passage 130 includes, for example, the inlet 114, an inlet-side passage 131, an outlet-side passage 132, the outlet 116, a foreign substance discharge passage 133, and the foreign substance discharge port 115. For example, the sub-passage 130 takes in a part of air flowing through the intake passage 202 from the inlet 114 opened toward the upstream side in the first direction D1, detours the air to the inlet-side passage 131, the outlet-side passage 132, and the foreign substance discharge passage 133, and returns the air to the intake passage 202 from the outlet 116 and the foreign substance discharge port 115 opened toward the downstream side in the first direction D1.

The sub-passage groove 117 includes, for example, a first sub-passage groove 117a, a second sub-passage groove 117b, and a third sub-passage groove 117c. As illustrated in FIG. 5, the first sub-passage groove 117a extends in the first direction D1 from the inlet 114 opened in the side surface 113c on the upstream side of the measurement unit 113, is curved from the first direction D1 in the second direction D2, and is curved and extends toward the flange 111 of a proximal end portion of the measurement unit 113 along the second direction D2.

The inlet-side passage 131 of the sub-passage 130 is formed between the first sub-passage groove 117a and the cover 120. An upstream end of the inlet-side passage 131 is connected to the inlet 114. The inlet-side passage 131 includes, for example, an inlet-side upstream portion 131a extending from the inlet 114 in the first direction D1, and an inlet-side downstream portion 131b extending from the inlet-side upstream portion 131a in the second direction D2 orthogonal to the first direction D1 and having a downstream end at which the flow rate detection unit 151 is disposed.

Furthermore, the third sub-passage groove 117c branches from the first sub-passage groove 117a, and extends along the first direction D1 to the foreign substance discharge port 115 opened in the side surface 113d on the downstream side of the measurement unit 113. The foreign substance discharge passage 133 extending in the first direction D1 from the inlet-side upstream portion 131a toward the foreign substance discharge port 115 is formed between the third sub-passage groove 117c and the cover 120. The foreign substance discharge passage 133 returns a part of the air taken in from the inlet 114 to the intake passage 202 from the foreign substance discharge port 115 together with foreign substances such as dust taken in from the inlet 114. The foreign substance discharge port 115 is opened toward the downstream side in the first direction D1 at a position away from the outlet 116 in the second direction D2 beyond a downstream end of the outlet-side downstream portion 132b.

Furthermore, the second sub-passage groove 117b curves in a U shape so as to be folded back in a direction opposite to the second direction D2 from a downstream end of the first sub-passage groove 117a, and further extends toward the outlet 116 of a distal end portion of the measurement unit 113 along the second direction D2. The outlet-side passage 132 of the sub-passage 130 is formed between the second sub-passage groove 117b and the cover 120. The outlet-side passage 132 includes, for example, an outlet-side upstream portion 132a and an outlet-side downstream portion 132b.

The outlet-side upstream portion 132a is curved in, for example, a U shape so as to be folded back from the inlet-side downstream portion 131b toward a distal end portion in a direction opposite to the second direction D2, that is, a protruding direction of the measurement unit 113. The outlet-side downstream portion 132b extends, for example, in the second direction D2 from a downstream end of the outlet-side upstream portion 132a toward the outlet 116, and the attenuation chamber 134 is provided at a downstream end. Moreover, the downstream end of the outlet-side downstream portion 132b extends in the second direction D2 beyond the outlet 116, for example, and forms a recessed portion 134a in the attenuation chamber 134.

With regard to the recessed portion 134a, for example, only an upstream end portion of the outlet-side downstream portion 132b is opened, and a bottom portion that is a downstream end portion of the outlet-side downstream portion 132b and a side wall portion around the bottom portion are closed. That is, the recessed portion 134a is a dead end or a blind alley at the downstream end of the outlet-side downstream portion 132b. An open end of the recessed portion 134a is adjacent to one end of the outlet 116 that opens in the first direction D1.

Figure 7:
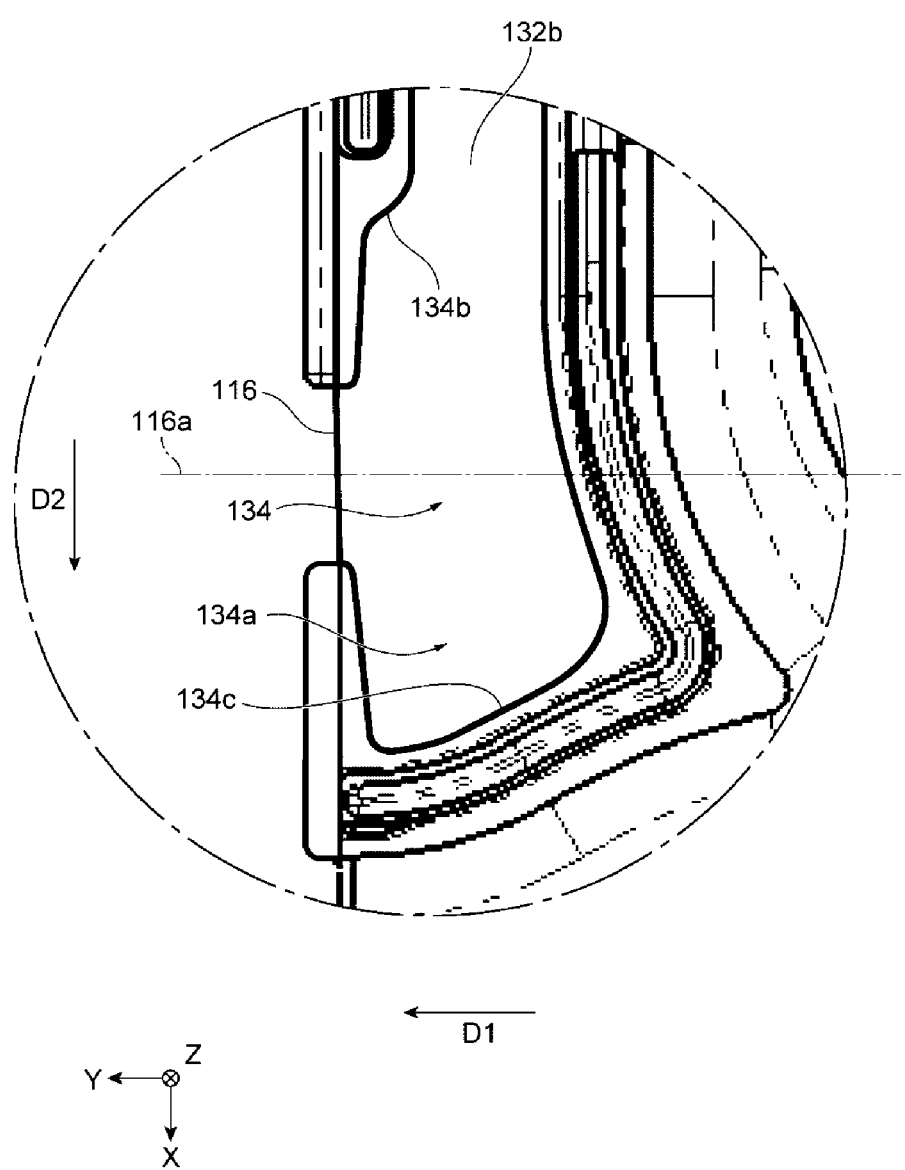
FIG. 7 is an enlarged view of an attenuation chamber of the physical quantity detection device in which a portion VII in FIG. 5 is enlarged.
Figure 8:
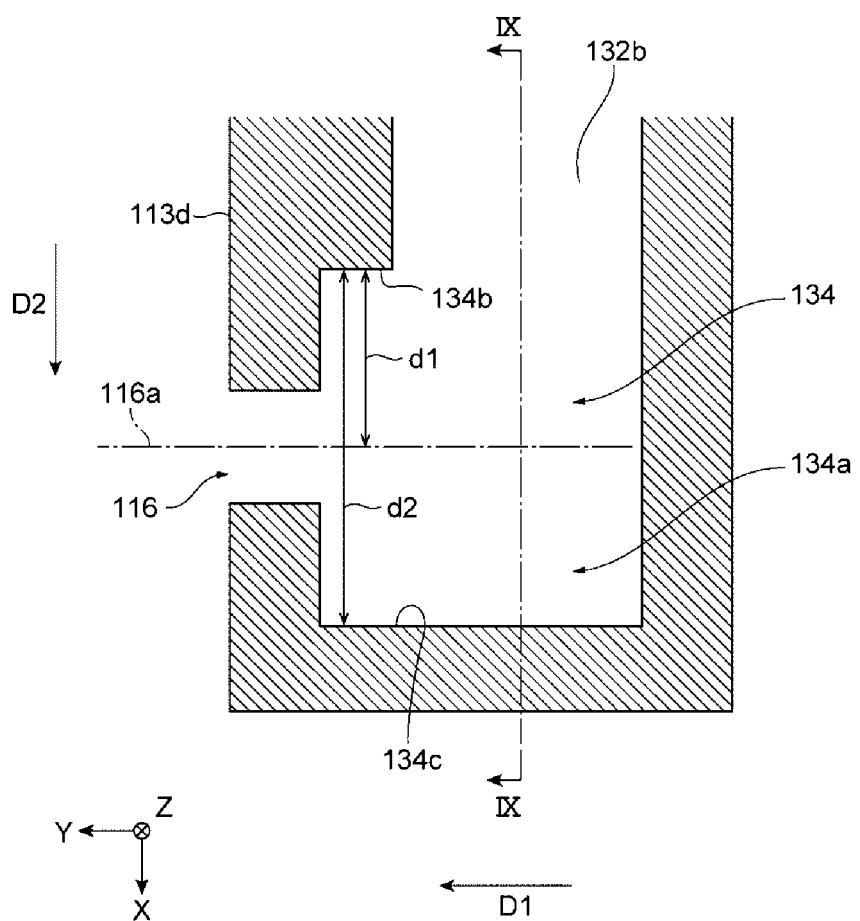
FIG. 8 is a schematic diagram of the attenuation chamber of FIG. 7.

FIG. 7 is an enlarged view of a portion VII of the attenuation chamber 134 formed at the downstream end of the outlet-side downstream portion 132b of the sub-passage 130 illustrated in FIG. 5. FIG. 8 is a schematic diagram of the attenuation chamber 134 illustrated in FIG. 7. The attenuation chamber 134 is formed, for example, by enlarging the downstream end of the outlet-side downstream portion 132b more than the upstream side thereof. More specifically, in the attenuation chamber 134, for example, a cross-sectional area of a cross section orthogonal to the second direction D2 is enlarged as compared with the outlet-side downstream portion 132b on the upstream side thereof.

The attenuation chamber 134 attenuates, for example, a sound wave having a frequency corresponding to a resonance frequency of the sub-passage 130. A resonance frequency ω of the sub-passage 130 can be calculated based on the following Formula (1), for example, assuming that a sound speed is c, an opening area of the outlet 116 is S, a flow path length of the sub-passage 130 from the outlet 116 to the inlet 114 is L, and a volume of the sub-passage 130 from the outlet 116 to the inlet 114 is V.

[Mathematical formula 1]

$$\omega = c\sqrt{\frac{S}{VL}} \quad (1)$$

Note that the flow path length L in the above Formula (1) is, for example, the sum of a length of the center line from the downstream end to the upstream end of the outlet-side passage 132 and a length of the center line from the downstream end to the upstream end of the inlet-side passage 131. Similarly, the volume V in the above Formula (1) is, for example, the sum of a volume of the outlet-side passage 132 and a volume of the inlet-side passage 131. Furthermore, the flow path length L may include, for example, a length of a center line from a center of the foreign substance discharge port 115 to an upstream end of the foreign substance discharge passage 133, and similarly, the volume V may include, for example, a volume of the foreign substance discharge passage 133. Furthermore, the resonance frequency ω of the sub-passage 130 may be obtained by, for example, an experiment or a computer simulation.

The attenuation chamber 134 includes, for example, a reflection wall 134b that reflects the sound wave propagated from the turbocharger 204 to the inside of the outlet 116 toward an outlet center line 116a that passes through a center of the outlet 116 and is parallel to the first direction D1. The reflection wall 134b is provided to face the outlet center line 116a.

More specifically, in the example illustrated in FIG. 7, the reflection wall 134b faces the outlet center line 116a in a state of being inclined with respect to the second direction D2. More specifically, the reflection wall 134b is inclined toward the outside of the outlet-side downstream portion 132b, that is, the side surface 113d on the downstream side of the measurement unit 113 in the intake passage 202 so as to expand the outlet-side downstream portion 132b from the upstream side to the downstream side of the outlet-side downstream portion 132b extending along the second direction D2.

Note that, as illustrated in FIG. 8, the reflection wall 134b may be parallel to the outlet center line 116a and the first direction D1 and orthogonal to the second direction D2. That is, the reflection wall 134b may be provided in a stepped shape so as to expand the outlet-side downstream portion 132b from the upstream side to the downstream side of the outlet-side downstream portion 132b. Furthermore, in the attenuation chamber 134, a plurality of the reflection walls 134b may be provided in a stepwise manner so as to gradually expand the outlet-side downstream portion 132b from the upstream side to the downstream side of the outlet-side downstream portion 132b. In this case, each of the reflection walls 134b may be angled relative to the outlet center line 116a and may be parallel to the outlet center line 116a.

Furthermore, for example, as illustrated in FIG. 8, in the reflection wall 134b, a distance d1 to the outlet center line 116a in a reflection direction of a sound wave propagating inside the outlet 116 is set to a ¼ wavelength of the reflected sound wave. That is, when a wavelength of the sound wave reflected by the reflection wall 134b and a re-reflection wall 134c is λ, the following Formula (2) is established.

$$d1 = \lambda/4 \quad (2)$$

Here, for example, as illustrated in FIG. 8, an incident direction and a reflection direction of the sound wave with respect to the reflection wall 134b are parallel to the second direction D2 which is an extending direction of the outlet-side downstream portion 132b, and are directions orthogonal to the outlet center line 116a. Note that the incident direction of the sound wave on the reflection wall 134b and the reflection direction of the sound wave by the reflection wall 134b may be obtained by, for example, simulation by a computer.

The wavelength A of the sound wave in the above Formula (2) is, for example, a wavelength corresponding to the resonance frequency ω of the sub-passage 130. That is, the distance d1 between the reflection wall 134b and the outlet center line 116a can be expressed by the following Formula (3), for example, with the sound speed as c.

$$d1 = c/4\omega \quad (3)$$

Furthermore, the attenuation chamber 134 includes, for example, the re-reflection wall 134c that re-reflects the sound wave reflected by the reflection wall 134b. The re-reflection wall 134c is provided, for example, in parallel with the reflection wall 134b and faces the reflection wall 134b. In the re-reflection wall 134c, a distance d2 to the opposing reflection wall 134b is set to an integral multiple of twice or more of a ¼ wavelength of the sound wave. That is, when a wavelength of the sound wave reflected by the reflection wall 134b and the re-reflection wall 134c is A and n is an integer of 1 or more, the following Formula (4) is established.

$$d2 = (n+1) \cdot \lambda/4 \quad (4)$$

The wavelength A of the sound wave in the above Formula (4) is, for example, a wavelength corresponding to the resonance frequency ω of the sub-passage 130. That is, the distance d2 between the reflection wall 134b and the re-reflection wall 134c can be expressed by the following Formula (5), for example, with the sound speed as c.

$$d2 = (n+1) \cdot c/4\omega \quad (5)$$

In the example illustrated in FIGS. 7 and 8, one reflection wall 134b is formed on the inner wall provided with the outlet 116 of the attenuation chamber 134. However, the configuration of the attenuation chamber 134 is not limited to the example illustrated in FIGS. 7 and 8. Hereinafter, a modification example of the attenuation chamber 134 illustrated in FIGS. 7 and 8 will be described with reference to FIGS. 9 and 10.

Figure 9:
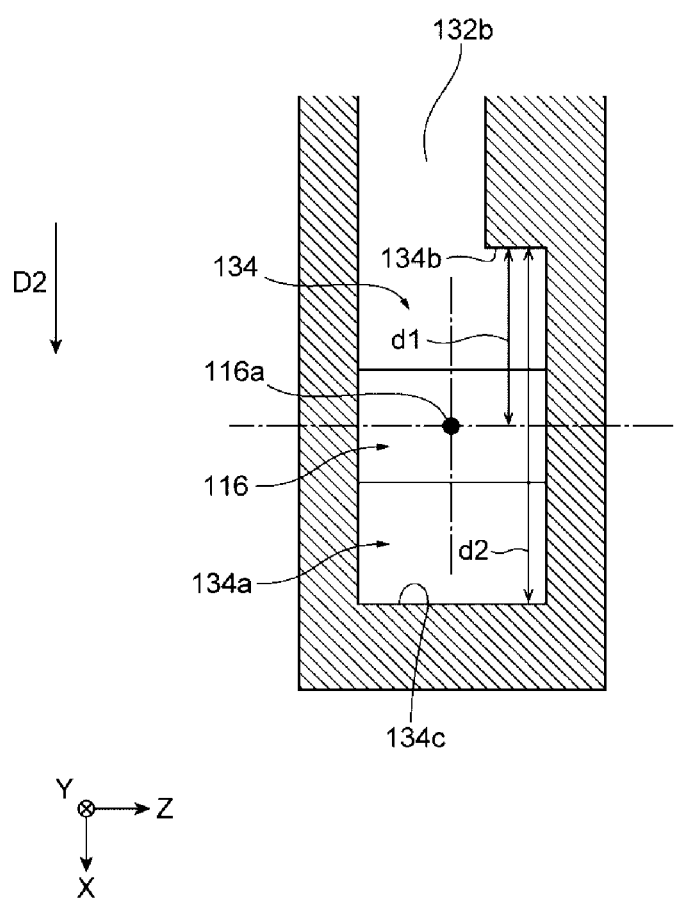
FIG. 9 is a schematic view illustrating a modification example of the attenuation chamber of FIG. 8.

FIG. 9 is a schematic cross-sectional view of a modification example of the attenuation chamber 134 corresponding to a cross section taken along line IX-IX in FIG. 8. In the attenuation chamber 134, for example, the reflection wall 134b may be provided on a wall surface in the thickness direction (Z-axis direction) of the measurement unit 113 of the physical quantity detection device 100 orthogonal to the first direction D1 and the second direction D2. That is, the reflection wall 134b can be formed, for example, on a bottom surface of the second sub-passage groove 117b provided in the measurement unit 113 of the housing 110 or an inner surface of the cover 120.

Figure 10:
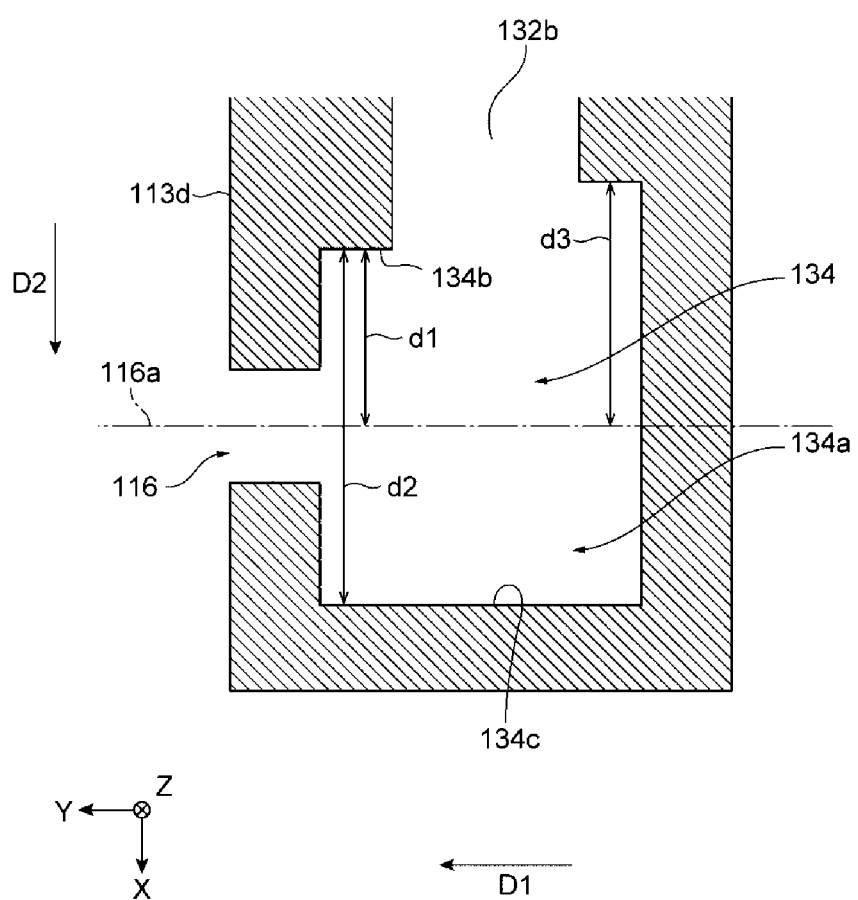
FIG. 10 is a schematic view illustrating a modification example of the attenuation chamber of FIG. 8.

FIG. 10 is a schematic diagram illustrating a modification example of the attenuation chamber 134 of FIG. 8. In this modification example, the attenuation chamber 134 includes a plurality of reflection walls 134b and 134d corresponding to a plurality of sound waves having different wavelengths. That is, a distance d3 between the reflection wall 134d and the outlet center line 116a can be calculated by the following Formula (6) when a wavelength of the sound wave reflected by the reflection wall 134d is λ'.

$$d3 = \lambda'/4 \quad (6)$$

Note that, in FIG. 10, the two reflection walls 134b and 134d corresponding to sound waves having two different wavelengths are illustrated, but three or more reflection walls corresponding to sound waves having three or more different wavelengths may be provided.

As illustrated in FIG. 5, the circuit chamber 118 is provided in a recessed shape on a proximal end side of the measurement unit 113 connected to the flange 111 on a side of the back surface 113b of the measurement unit 113 of the housing 110, and houses the circuit board 140. The circuit chamber 118 is provided adjacent to the inlet-side downstream portion 131b and the outlet-side upstream portion 132a on the proximal end side of the measurement unit 113 with respect to the inlet-side upstream portion 131a of the inlet-side passage 131 and on the upstream side in the first direction D1 with respect to the outlet-side passage 132.

As illustrated in FIG. 6, the chip package 150 includes the flow rate detecting unit 151, an electronic component 152, a lead frame 154, and a resin sealing portion 155. The flow rate detection unit 151 is, for example, a thermal flow rate sensor. The flow rate detection unit 151 includes, for example, a semiconductor substrate, a thin film portion formed on a front surface side of the semiconductor substrate and exposed from the resin sealing portion 155, and a recess formed on a back surface side of the semiconductor substrate and forming the thin film portion. Furthermore, the flow rate detection unit 151 includes a pair of temperature sensors provided on a surface side of the thin film portion and a heater disposed between the pair of temperature sensors, and is mounted on the lead frame 154.

The electronic component 152 is mounted on the lead frame 154 and drives the flow rate detection unit 151. The lead frame 154 includes a connection terminal protruding from the resin sealing portion 155. The connection terminal is mounted on the circuit board 140 via a bonding material such as solder. The resin sealing portion 155 is molded by, for example, transfer molding of a thermosetting resin, and integrally seals the flow rate detection unit 151, the electronic component 152, and the lead frame 154.

For example, as illustrated in FIG. 6, the flow rate detection unit 151 detects a flow rate of the gas flowing through the flow rate detection passage 131c formed between the circuit board 140 and a recessed groove of the chip package 150. The flow rate detection passage 131c is formed, for example, in the inlet-side downstream portion 131b of the sub-passage 130.

Furthermore, as illustrated in FIG. 5, at least one of a temperature sensor 160, a pressure sensor 170, and a humidity sensor 180 is mounted on the circuit board 140 in addition to the chip package 150 including the flow rate detection unit 151. The connection terminal of each sensor is sealed by, for example, a sealing material 141. In the present embodiment, the temperature sensor 160, the pressure sensor 170, and the humidity sensor 180 are mounted on the circuit board 140, but any one of the sensors may be omitted.

The temperature sensor 160 is, for example, a chip-type temperature sensor mounted on the circuit board 140. For example, the temperature sensor 160 is disposed at a distal end portion of an extending portion 140c of the circuit board 140 extending toward a distal end of the measurement unit 113 in the second direction D2 that is the protruding direction of the measurement unit 113. As illustrated in FIG. 2, the temperature sensor 160 is disposed in a temperature detection passage 190 of the measurement unit 113, and measures a temperature of the gas taken into the temperature detection passage 190 from the intake passage 202.

The temperature detection passage 190 includes an inlet on the side surface 113c on the upstream side of the measurement unit 113, and includes outlets on both the front surface 113a and the back surface 113b of the measurement unit 113. The temperature detection passage 190 takes in the air flowing through the intake passage 202 from an inlet opening on the side surface 113c on the upstream side of the measurement unit 113, and discharges the air to the intake passage 202 from outlets opening on the front surface 113a and the back surface 113b of the measurement unit 113. With such a configuration, heat dissipation of the temperature sensor 160 can be improved.

The pressure sensor 170 is mounted on the circuit board 140 and disposed in the circuit chamber 118, for example. The circuit chamber 118 communicates with an outlet-side upstream portion 132a of the sub-passage 130 curved in a U shape in the vicinity of the flange 111. As a result, a pressure of the gas flowing through the sub-passage 130 can be measured by the pressure sensor 170 disposed in the circuit chamber 118.

The humidity sensor 180 is mounted on the circuit board 140, for example, and is disposed in a partitioned area on a distal end side of the measurement unit 113 with respect to the circuit chamber 118. The humidity sensor 180 detects, for example, a humidity of the gas taken into the sub-passage 130 from the intake passage 202.

Hereinafter, an action of the physical quantity detection device 100 of the present embodiment will be described.

As described above, the physical quantity detection device 100 of the present embodiment is a device that detects a physical quantity of air taken in from the intake passage 202 of the engine 201 on which the turbocharger 204 is mounted. The physical quantity detection device 100 includes a sub-passage 130 that takes in a part of air flowing from the upstream side to the downstream side of the intake passage 202 along the first direction D1 parallel to the center line 202a of the intake passage 202, and a flow rate detection unit 151 that detects a flow rate of the air taken in the sub-passage 130. The sub-passage 130 includes an inlet 114 that opens toward the upstream side in the first direction D1, an outlet 116 that opens toward the downstream side in the first direction D1, and an attenuation chamber 134 that attenuates a sound wave propagating from the turbocharger 204 to an inside of the outlet 116.

With such a configuration, the physical quantity detection device 100 of the present embodiment can attenuate the sound wave propagating from the turbocharger 204 to the inside of the outlet 116 of the sub-passage 130 by the attenuation chamber 134 of the sub-passage 130. As a result, it is possible to suppress the vibration of the air in the sub-passage 130 due to the influence of the sound wave propagating to the inside of the outlet 116 of the sub-passage 130 and to suppress the decrease in the detection accuracy of the air flow rate by the flow rate detection unit 151. Therefore, according to the physical quantity detection device 100 of the present embodiment, for example, even in a case where the distance from the turbocharger 204 is shortened compared to the related art, it is possible to reduce the influence of the sound wave generated in the turbocharger 204 and suppress the decrease in the detection accuracy of the physical quantity including the flow rate of the gas.

Furthermore, in the physical quantity detection device 100 of the present embodiment, the attenuation chamber 134 includes the reflection wall 134b that reflects the sound wave propagated to the inside of the outlet 116 toward the outlet center line 116a that passes through the center of the outlet 116 and is parallel to the first direction D1. The reflection wall 134b is provided to face the outlet center line 116a, and the distance d1 to the outlet center line 116a in the reflection direction of the sound wave is a ¼ wavelength of the sound wave.

With such a configuration, in the physical quantity detection device 100 of the present embodiment, the sound wave propagating from the turbocharger 204 to the inside of the outlet 116 and reflected by the reflection wall 134b and reaching the outlet center line 116a is shifted by ½ wavelength. As a result, the sound wave newly propagating from the turbocharger 204 to the inside of the outlet 116 and the sound wave reflected by the reflection wall 134b cancel each other. Therefore, sound waves propagating inside the outlet 116 can be attenuated in the attenuation chamber 134.

Furthermore, in the physical quantity detection device 100 of the present embodiment, the attenuation chamber 134 may include the plurality of reflection walls 134b and 134d corresponding to a plurality of sound waves having different wavelengths. With such a configuration, the physical quantity detection device 100 of the present embodiment can selectively attenuate sound waves of a plurality of different specific wavelengths in the attenuation chamber 134.

Furthermore, in the physical quantity detection device 100 of the present embodiment, the attenuation chamber 134 includes a re-reflection wall 134c that re-reflects the sound wave reflected by the reflection wall 134b. The distance d2 of the re-reflection wall 134c to the opposing reflection wall 134b is an integral multiple of twice or more of the ¼ wavelength of the reflected sound wave. With such a configuration, in the physical quantity detection device 100 of the present embodiment, the sound wave re-reflected by the re-reflection wall 134c and the sound wave reflected by the reflection wall 134b or the sound wave newly propagated to the inside of the outlet 116 cancel each other. Therefore, the sound wave propagating to the inside of the outlet 116 of the sub-passage 130 can be more effectively attenuated in the attenuation chamber 134.

Furthermore, in the physical quantity detection device 100 of the exemplary embodiment, the sub-passage 130 includes the inlet-side passage 131 connected to the inlet 114, and the outlet-side passage 132 connected to the inlet-side passage 131 and the outlet 116. Furthermore, the inlet-side passage 131 includes the inlet-side upstream portion 131a extending from the inlet 114 in the first direction D1, and the inlet-side downstream portion 131b extending from the inlet-side upstream portion 131a in the second direction D2 orthogonal to the first direction D1 and in which the flow rate detection unit 151 is disposed. Furthermore, the outlet-side passage 132 includes the outlet-side upstream portion 132a curved so as to turn back in a direction opposite to the second direction D2 from the inlet-side downstream portion 131b, and the outlet-side downstream portion 132b extending in the second direction D2 from the outlet-side upstream portion 132a toward the outlet 116 and provided with the attenuation chamber 134 at a downstream end.

With such a configuration, the physical quantity detection device 100 of the present embodiment can reduce a detection error of the flow rate detection unit 151 due to the backflow or pulsation of the air in the intake passage 202 by the curved shape of the sub-passage 130 from the inlet 114 to the outlet 116.

Furthermore, in the physical quantity detection device 100 of the present embodiment, the downstream end of the outlet-side downstream portion 132b of the outlet-side passage 132 of the sub-passage 130 extends in the second direction D2 beyond the outlet 116, and forms the recessed portion 134a in the attenuation chamber 134. With such a configuration, the physical quantity detection device 100 of the present embodiment can repeatedly reflect and attenuate the sound wave in the recessed portion 134a of the attenuation chamber 134.

Moreover, in the example illustrated in FIG. 7, the wall surface facing the outlet 116 of the attenuation chamber 134 is formed in a smooth curved surface shape bulging to an opposite side of the outlet 116 from a portion facing the outlet 116 to a bottom surface of the recessed portion 134a. With such a configuration, it is possible to easily repeatedly reflect the sound wave in the recessed portion 134a of the attenuation chamber 134.

Furthermore, in the physical quantity detection device 100 of the present embodiment, the sub-passage 130 includes the foreign substance discharge port 115 that opens toward the downstream side in the first direction D1 at a position away from the outlet 116 in the second direction D2 beyond the downstream end of the outlet-side downstream portion 132b. Moreover, the sub-passage 130 includes the foreign substance discharge passage 133 extending in the first direction D1 from the inlet-side upstream portion 131a toward the foreign substance discharge port 115.

With such a configuration, the physical quantity detection device 100 of the present embodiment can discharge foreign substances such as dust taken into the sub-passage 130 from the inlet 114 from the foreign substance discharge port 115 via the inlet-side upstream portion 131a and the foreign substance discharge passage 133. As a result, foreign substances contained in the air flowing from the inlet-side upstream portion 131a to the inlet-side downstream portion 131b can be reduced, and the contamination resistance of the flow rate detection unit 151 can be improved.

Furthermore, in the physical quantity detection device 100 of the present embodiment, the attenuation chamber 134 attenuates a sound wave having a frequency corresponding to the resonance frequency ω of the sub-passage 130. With such a configuration, the physical quantity detection device 100 of the present embodiment can prevent the air inside the sub-passage 130 from resonating due to the influence of the sound wave propagated to the inside of the outlet 116 of the sub-passage 130, and can reduce a detection error of the flow rate of the air by the flow rate detection unit 151.

Although the embodiment of the physical quantity detection device according to the present disclosure has been described in detail with reference to the drawings, the specific configuration is not limited to this embodiment, and design changes and the like without departing from the gist of the present disclosure are included in the present disclosure.

For example, in the above-described embodiment, the attenuation chamber 134 includes the reflection wall 134b that reflects the sound wave propagating from the turbocharger 204 to the inside of the outlet 116 of the sub-passage 130 toward the outlet center line 116a. Furthermore, the reflection wall 134b is provided to face the outlet center line 116a, and the distance to the outlet center line 116a in the reflection direction of the sound wave is a ¼ wavelength of the sound wave. However, the physical quantity detection device according to the present disclosure is not limited to this embodiment. That is, the attenuation chamber 134 may not include the reflection wall 134b. In this case, for example, the sound wave can be attenuated by providing unevenness or a sound absorbing material on the inner wall surface of the attenuation chamber 134 or enlarging a cross-sectional area of the attenuation chamber 134 larger than a cross-sectional area of the outlet-side downstream portion 132b.

REFERENCE SIGNS LIST 100 physical quantity detection device
114 inlet
115 foreign substance discharge port
116 outlet 116a outlet center line
130 sub-passage
131 inlet-side passage
131a inlet-side upstream portion
131b inlet-side downstream portion
132 outlet-side passage
132a outlet-side upstream portion
132b outlet-side downstream portion
133 foreign substance discharge passage
134 attenuation chamber
134a recessed portion
134b reflection wall
134c re-reflection wall
134d reflection wall
151 flow rate detection unit
201 engine
202 intake passage
202a center line
204 turbocharger
d1 distance
d2 distance
d3 distance
D1 first direction
D2 second direction
ω resonance frequency

The invention claimed is:

1. A physical quantity detection device that detects a physical quantity of air taken in from an intake passage of an engine equipped with a turbocharger, the physical quantity detection device comprising:
a sub-passage that takes in a part of air flowing from an upstream side to a downstream side of the intake passage along a first direction parallel to a center line of the intake passage; and
a flow rate detection unit that detects a flow rate of the air taken in the sub-passage,
wherein the sub-passage includes an inlet that opens toward the upstream side in the first direction, an outlet that opens toward the downstream side in the first direction, and an attenuation chamber that attenuates a sound wave propagating from the turbocharger to an inside of the outlet.

2. The physical quantity detection device according to claim 1, wherein
the attenuation chamber includes a reflection wall that reflects the sound wave toward an outlet center line that passes through a center of the outlet and is parallel to the first direction, and
the reflection wall is provided to face the outlet center line, and a distance to the outlet center line in a reflection direction of the sound wave is a ¼ wavelength of the sound wave.

3. The physical quantity detection device according to claim 2, wherein the attenuation chamber includes a plurality of the reflection walls corresponding to a plurality of the sound waves having different wavelengths.

4. The physical quantity detection device according to claim 2, wherein the attenuation chamber includes a re-reflection wall that re-reflects the sound wave reflected by the reflection wall, and the re-reflection wall has a distance to the opposing reflection wall that is an integral multiple of twice or more a ¼ wavelength of the sound wave.

5. The physical quantity detection device according to claim 2, wherein
the sub-passage includes an inlet-side passage connected to the inlet, and an outlet-side passage connected to the inlet-side passage and the outlet,
the inlet-side passage includes an inlet-side upstream portion extending from the inlet in the first direction, and an inlet-side downstream portion extending from the inlet-side upstream portion in a second direction orthogonal to the first direction and in which the flow rate detection unit is disposed, and
the outlet-side passage includes an outlet-side upstream portion curved so as to turn back in a direction opposite to the second direction from the inlet-side downstream portion, and an outlet-side downstream portion extending in the second direction from the outlet-side upstream portion toward the outlet and provided with the attenuation chamber at a downstream end.

6. The physical quantity detection device according to claim 5, wherein the downstream end of the outlet-side downstream portion extends in the second direction beyond the outlet, and forms a recessed portion in the attenuation chamber.

7. The physical quantity detection device according to claim 5, wherein the sub-passage includes a foreign substance discharge port that opens toward the downstream side in the first direction at a position away from the outlet in the second direction beyond the downstream end of the outlet-side downstream portion, and a foreign substance discharge passage that extends in the first direction from the inlet-side upstream portion toward the foreign substance discharge port.

8. The physical quantity detection device according to claim 1, wherein the attenuation chamber attenuates the sound wave having a frequency corresponding to a resonance frequency of the sub-passage.

* * * * *